United States Patent
Hess et al.

(10) Patent No.: US 12,475,776 B2
(45) Date of Patent: Nov. 18, 2025

(54) PORTABLE ALARM SYSTEM WITH ON DEMAND REPORTING TO MONITORING STATION

(71) Applicant: HIPPI, LLC, Clermont, FL (US)

(72) Inventors: Brian K. Hess, Clermont, FL (US); Frank B. Clark, Longview, TX (US)

(73) Assignee: Hippi LLC, Clermont, FL (US)

(*) Notice: Subject to any disclaimer, the term of this patent is extended or adjusted under 35 U.S.C. 154(b) by 0 days.

(21) Appl. No.: 18/127,609

(22) Filed: Mar. 28, 2023

(65) Prior Publication Data

US 2023/0316894 A1 Oct. 5, 2023

Related U.S. Application Data

(60) Provisional application No. 63/324,529, filed on Mar. 28, 2022.

(51) Int. Cl.
*G08B 23/00* (2006.01)

(52) U.S. Cl.
CPC .................................. *G08B 23/00* (2013.01)

(58) Field of Classification Search
None
See application file for complete search history.

(56) References Cited

U.S. PATENT DOCUMENTS

| | | | | |
|---|---|---|---|---|
| 6,300,871 B1* | 10/2001 | Irwin | ...................... | G01K 1/024 374/E1.004 |
| 8,041,779 B2* | 10/2011 | Habaguchi | ........... | G06Q 10/063 709/219 |
| 8,560,345 B2* | 10/2013 | Wehba | .................. | A61M 5/142 604/890.1 |
| 9,043,217 B2* | 5/2015 | Cashman | ............... | G16H 70/00 705/2 |
| 9,443,415 B2* | 9/2016 | Nepo | .................... | G08B 15/004 |
| 10,140,839 B1* | 11/2018 | Smith | .................. | G08B 25/001 |
| 10,856,136 B1* | 12/2020 | Espy | ..................... | H04W 4/021 |
| 11,160,452 B2* | 11/2021 | Mensinger | ........... | A61B 5/0022 |
| 12,031,309 B2* | 7/2024 | Gunawardena | ......... | E03C 1/057 |
| 2003/0097054 A1* | 5/2003 | Sasaki | ..................... | A61B 8/565 600/407 |
| 2008/0162352 A1* | 7/2008 | Gizewski | ................ | G16Z 99/00 705/50 |
| 2009/0225164 A1* | 9/2009 | Renkis | ............. | G08B 13/19656 715/848 |
| 2012/0182939 A1* | 7/2012 | Rajan | ..................... | A61B 5/002 370/328 |
| 2014/0201315 A1* | 7/2014 | Jacob | ..................... | H04L 41/16 709/217 |
| 2015/0163631 A1* | 6/2015 | Quam | ..................... | F24F 11/523 455/456.1 |

(Continued)

*Primary Examiner* — Muhammad Adnan
(74) *Attorney, Agent, or Firm* — Harness Dickey & Pierce PLC

(57) ABSTRACT

A portable alarm system is disclosed, which includes a base unit that is selectively programable to report select trigger events to a monitoring station according to a programmed rule. An app on a mobile electric device is configured to permit a user to override a programmed rule to cause a trigger event to be reported to the monitoring station in real time, where in the absence of such override, the programmed rule would not cause the trigger event to be reported to the monitoring station.

2 Claims, 5 Drawing Sheets

(56) References Cited

U.S. PATENT DOCUMENTS

| | | | |
|---|---|---|---|
| 2016/0191864 A1* | 6/2016 | Siminoff | H04M 11/025 |
| | | | 348/155 |
| 2019/0027011 A1* | 1/2019 | Gordon | B60Q 9/00 |
| 2019/0237204 A1* | 8/2019 | Huang | A61B 5/7465 |
| 2021/0084710 A1* | 3/2021 | Sutherland | H04W 4/021 |
| 2021/0241912 A1* | 8/2021 | Chazin | G08B 21/0446 |
| 2023/0252874 A1* | 8/2023 | ElDelgawy | G06V 40/10 |
| | | | 340/573.1 |
| 2024/0135801 A1* | 4/2024 | Hutz | G08B 31/00 |

\* cited by examiner

PORTABLE ALARM SYSTEM WITH ON DEMAND REPORTING TO MONITORING STATION

CROSS-REFERENCE TO RELATED APPLICATIONS

This application claims the benefit of U.S. Provisional Application No. 63/324,529, filed on Mar. 28, 2022. The entire disclosure of the above application is incorporated herein by reference.

FIELD

The present disclosure relates to a portable alarm system that communicates with an app on a portable electronic device (e.g., smart phone) to allow a user to cause the portable alarm system to report a trigger event to a monitoring station in real time, i.e., at the time of the trigger event.

BACKGROUND

This section provides background information related to the present disclosure which is not necessarily prior art.

Portable alarm systems are now known in the marketplace. Exemplary portable alarm systems are manufactured and sold by Tattletale Portable Alarm Systems, Inc. of Columbus, Ohio. The following United States Patents describe representative portable alarm systems: U.S. Pat. Nos. 5,587,701; 6,049,273; 6,831,557; 5,777,551; 7,327,220, 8,643,486; 10,134,265; and 10,169,981, all of which are incorporated herein by reference. Generally, these portable alarm systems include a portable base unit and at least one remote sensor, which is configured to communicate wirelessly with the portable base unit. The sensor may be conventional wireless window/door sensors, motion sensors, glass breakage sensors and the like. The base unit includes a microprocessor, a receiver configured to receive wireless signals from the wireless sensor 14 and a wireless transceiver configured to communicate over known wireless networks, such as 3G, 4G LTE and 5G networks. The portable base unit may also include an integrated motion sensor and a rechargeable battery. In operation, when the sensor detects a trigger event (e.g., window opening, door opening, glass breakage, motion, smoke detection, water detection, carbon dioxide detection, etc.), the wireless sensor emits a wireless signal, which is received by a receiver in the base unit. The receiver converts the wireless signal to an electrical signal, which is communicated to the microprocessor. The microprocessor may then cause the transceiver to initiate a wireless communication to a remote location, e.g., a monitoring station or a designated telephone number, or to initiate other types of communications, such as a text message or alert to a smart phone or other mobile electronic device.

The identified inventors have developed a portable alarm system having improved features over the known portable alarm systems, as described hereinbelow.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
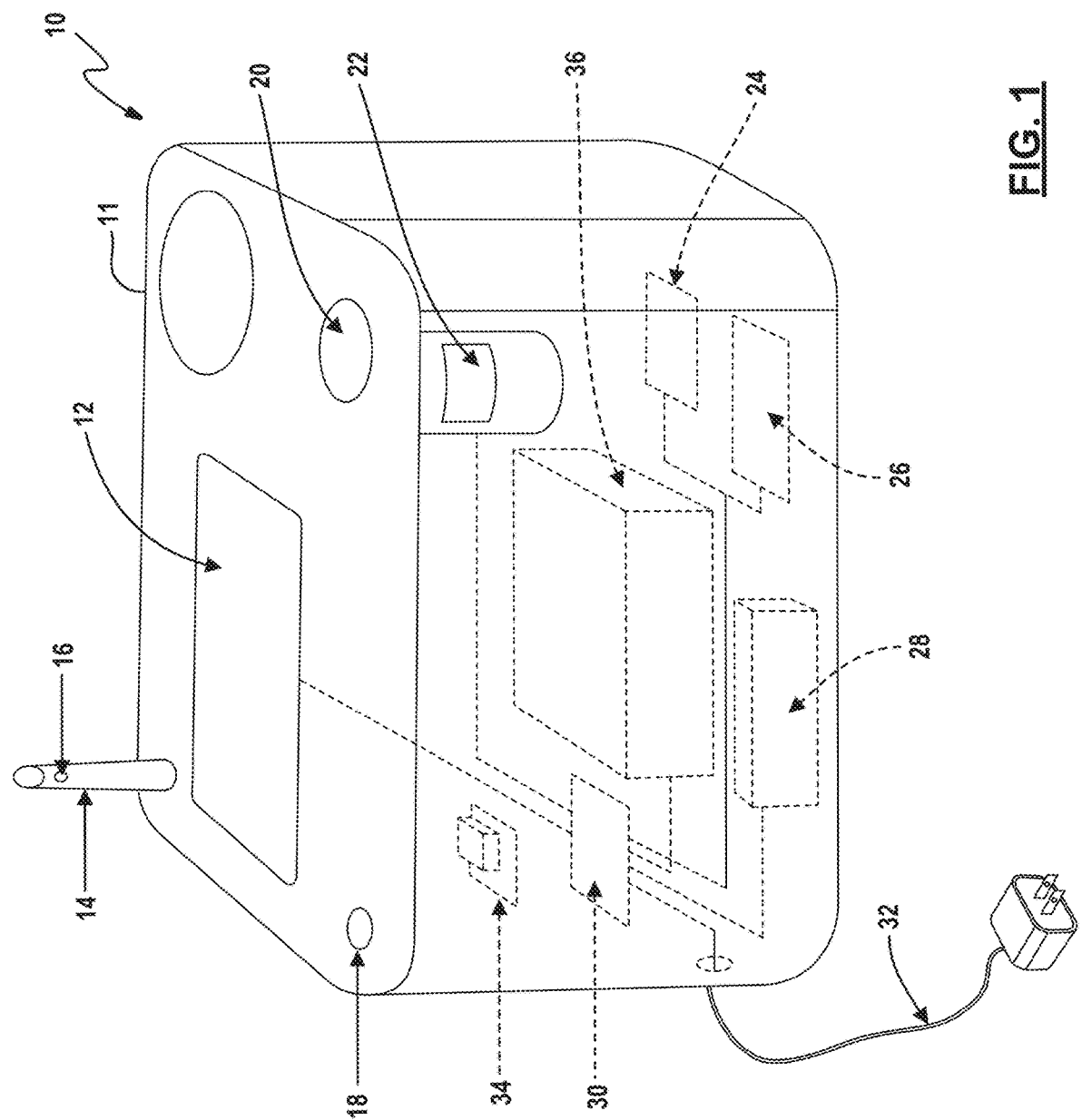
FIG. 1 is a front perspective view of a portable alarm base unit according to an embodiment of the invention, including illustrations of select internal componentry.
Figure 2:
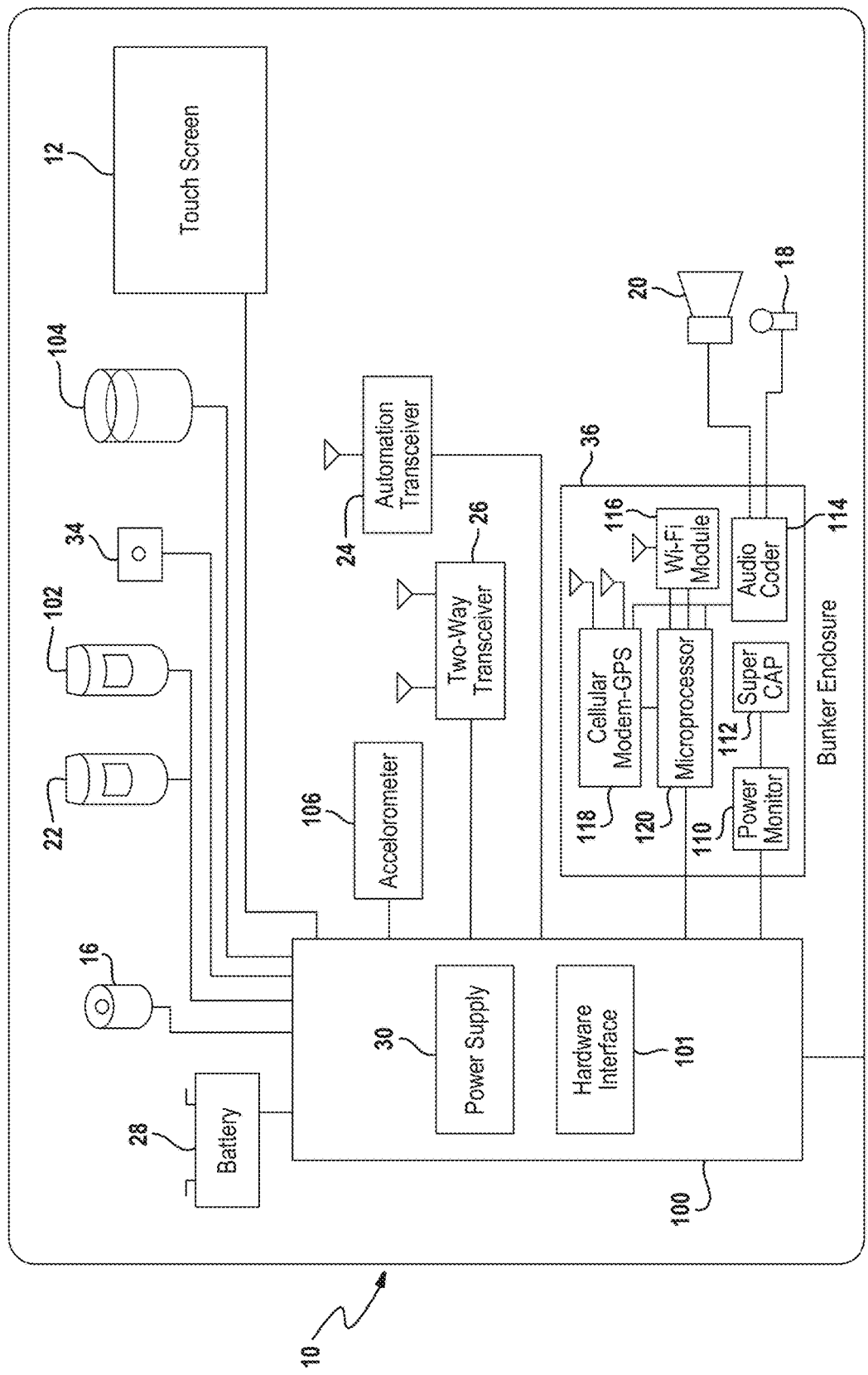
FIG. 2 is a functional diagram of the internal componentry of the exemplary portable alarm base unit illustrated in FIG. 1.

FIG. 1 illustrates a portable alarm base unit 10 from a front perspective view. FIG. 2 is a functional diagram of the portable alarm base unit 10. Components common to both figures maintain the same reference number. With reference to FIGS. 1 and 2, the portable alarm base unit 10 includes a housing 11 that includes various components on the external surface thereof and enclosed thereby that cooperate to operate the portable alarm system. The base unit 10 may include: (i) touch screen display 12, (ii) rotatable camera 16 that may be mounted to an antenna 14, (iii) microphone 18, (iv) speaker 20, (v) strobe light 104, and (vi) front motion sensor 22, all of which are disposed on an outer surface of the housing 11. The base unit 10 may further include a power cord 32 that extends external to the housing 11 to plug into a standard wall power outlet. The base unit 10 may also include a rear motion sensor 102 (not shown in FIG. 1). The following components may be incorporated inside of housing 11: (i) a hardware module 100, which includes a power supply 30 and a hardware interface 101, (ii) a Z-wave or other automation transceiver 24, (iii) a two-way wireless transceiver 26, (iv) a backup battery 28, (v) an accelerometer 106, and (v) a pressure sensor 34. The housing 11 may also enclose the following components: (i) cellular modem and GPS unit 118, (ii) Wi-Fi transceiver 116, (iii) power module 110, (iv) power storage device 112, (v) CODEC 114, and (vi) microprocessor 120, which, because of their functionally-critical nature, may be protectively housed inside of a secondary protective housing 36.

The hardware module 100 supplies power (via power supply 30) and provides a hardware interface 101 to the various components housed in the base unit 10. The hardware module 100 receives power from battery 28 and/or from a standard wall outlet through power cord 32. Hardware module 100 is electrically connected to rotatable camera 16, front and rear motion sensors 22 and 102, pressure sensor 34, strobe light 104, and touchscreen display 12. The hardware module 100 is further electrically connected to accelerometer 106, two-way transceiver 26 and automation transceiver 24. Hardware module 100 is electrically connected to the power module 110 and the microprocessor 120 inside of the secondary protective housing 36. The microprocessor 120 is electrically connected to the Wi-Fi transceiver 116, the CODEC 114 and the cellular modem/GPS module 118.

Figure 3:
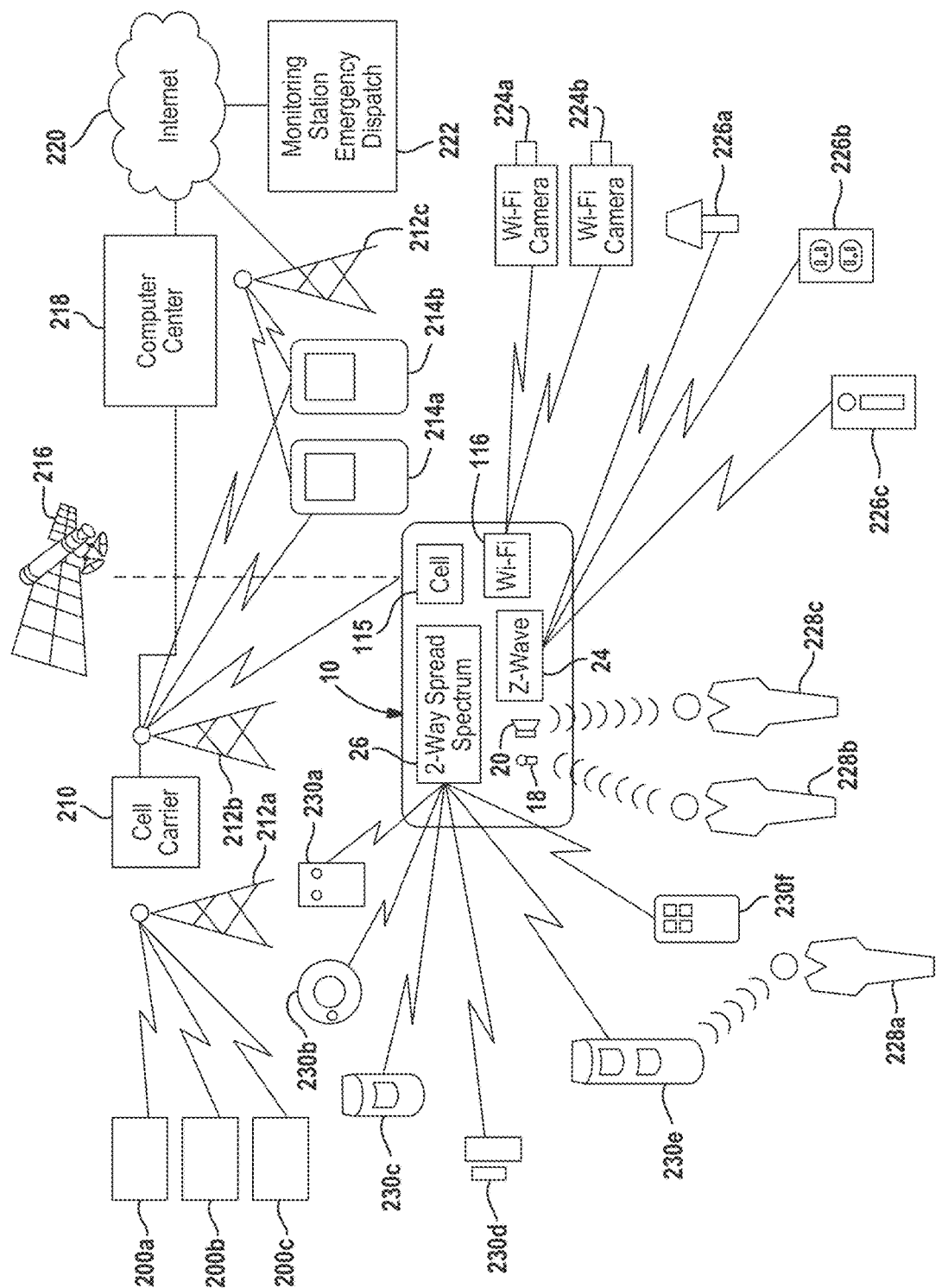
FIG. 3 is an environmental diagram illustrating communications between the portable alarm base unit shown in FIGS. 1 and 2 and various external devices.

FIG. 3 is an environmental illustration showing various communication paths of the base unit 10. The base unit 10 receives inputs from users 228a-c. The inputs can be tactile using the touchscreen display 12 or verbal. The users 228a-228c may also receive auditory alerts from the base unit 10. The base unit 10 further communicates with a variety of wireless sensors 230a-230d and key fobs and remote controls 230e-230f. The wireless sensors 230a-230d provide alarm signals to base unit 10 and key fobs and remote controls 230e-230f provide wireless control signals to base unit 10. Base units 200a-200c communicate wirelessly with cell tower 212a, which is communicatively coupled to cell carrier 210. Cell tower 212b is also communicatively coupled to cell carrier 210 and wirelessly communicates with cell phone devices 214a and 214b. Cell phone devices 214a and 214b can wirelessly communicate with monitoring station 222 and computer center 218 via cell tower 212c and internet 220. Base unit 10 communicates directly with cell phones 214a and 214b via cell tower 212b. Base unit 10 also communicates with computer center 218 via cell tower 212b and cell carrier 210. The computer center 218 communicates with the monitoring station 222 via internet 220. Base unit 10 can also communicate with satellite 216. Base unit 10 can also communicate wirelessly with a variety of sensors and monitoring devices, including Wi-Fi cameras 224a-b and home automation devices 226a-226c.

On-Demand Report to Monitoring Station

Known portable alarm systems provide users with the capability to program the base unit 10 (and particularly the microprocessor 120 of the base unit 10) to selectively report trigger events to various potential recipients. For example, it is known to program the base unit 10 to report trigger events to different pre-identified individuals or groups of individuals via various communications means, such as by email, text message and push style alerts to smart phones via apps, depending on the nature of the trigger event. Further, it is known to program the base unit 10 to program the base unit 10 to selectively report trigger events to the monitoring station 222, depending on the nature of the trigger event. For example, the base unit 10 may be programmed to report certain trigger events only to a primary user of the portable alarm system. The base unit 10 may be programmed to report other types of trigger events to the primary user of the portable alarm system plus other persons, such as neighbors, family or friends. The reports may be made by text message, email or a combination of the two, for example. Further, the base unit 10 may be programmed to report other types of trigger events to the monitoring station 222, either in addition to or instead of reporting the event directly to the primary user and/or other individuals directly. For example, it is known to program a base unit 10 to report trigger events that reflect urgent or dangerous events to the monitoring station 222 so that third-party assistance, such as police, fire and/or paramedic personnel may be dispatched to the location of the base unit 10 to provide assistance. On the other hand, certain trigger events considered less urgent or dangerous may only be reported to the primary user and/or other individuals without reporting such event to the monitoring station 222. This selective programming feature is useful because not every type of trigger event warrants the cost and logistics associated with a report to the monitoring station 222 and a subsequent dispatch of police, fire and/or paramedic personnel.

The known methods of selectively reporting trigger events to various individuals and/or to the monitoring station 222 are accomplished by pre-programming the base unit 10 to identify which recipients (individuals, groups of individuals and/or the monitoring station 222) should receive notification of each trigger event or groups of trigger events. In other words, the decision as to which individuals, groups of individuals will receive notification of a particular trigger event and whether such trigger event will be reported to the monitoring station 222 must be made at a time prior to the occurrence of the trigger event. While useful, this approach lacks certain flexibility that would be desirable to users of the portable alarm system.

The inventors have developed the following method of more flexibly determining whether a particular trigger event is reported to the monitoring station 222. The new method may also be used to more flexibly determine which individuals or group of individuals receive notification of the trigger event.

According to the inventive method, the microprocessor 120 of the base unit 10 receives a signal from a sensor indicative of a trigger event. The microprocessor 120 causes a wireless signal to be sent to an app on a cell phone device, such as a smart phone or other type of portable electronic device capable of receiving cellular signals. The app causes a message, such as a push alert, to be generated on the cell phone device. The message includes identifying information about the trigger event and a query to the user of the cell phone device as to whether to report the trigger event to the monitoring station 222. For example, the app may provide a notification such as "Front Door Open" and a virtual "button" on the screen of the cell phone device labeled "Report to Monitoring Station." The notification may also push a video clip or photo of the event, as applicable. If the user pushes the virtual button, then the app communicates to the base unit 10 instructions to report the trigger event to the monitoring station 222. In turn, the microprocessor 120 reports the trigger event to the monitoring station 222. Alternatively, the app communicates information concerning the trigger event directly to the monitoring station 222 without first passing through the base unit 10.

In this way, a user of the portable alarm system can pre-program the base unit 10 to refrain from reporting certain events to a monitoring station 222, but, at the time of the trigger event, choose to override that earlier programming and cause the trigger event to be reported to the monitoring station 222. This flexibility enables a user of the portable alarm system to choose whether to report a trigger event to a monitoring station at the time of the trigger event, as opposed to being committed to the pre-programmed reporting decision.

This method may also be used to enable a user to decide which other pre-programmed recipients will receive notification of a particular trigger event at the time of the trigger event. For example, in addition to providing a real-time option to the user to cause the base unit 10 to notify the monitoring station of the trigger event, the app may also provide an option to the user to notify other individuals or groups of individuals of the trigger event who were not pre-programmed to receive notification of the particular trigger event. For example, the app may provide an option to the user to notify a family member of the trigger event where that family member was not pre-programmed to receive notification of that particular trigger event.

Automatic Override

In addition to providing the user with flexibility to determine whether to notify the monitoring station 222 and/or other individuals or groups of individuals of the trigger event at the time the trigger event occurs, the app may be used to automatically override the pre-programmed notification rules depending on certain conditions. For example, the base unit 10 may be pre-programmed to only notify the primary user of the portable alarm system (e.g., by text message) in the event of a particular type of trigger event. The user may use the app to create a rule to automatically (without user intervention at the time of the trigger event) over-ride that pre-programmed notification rule under certain conditions that may be present at the time of the trigger event. For example, the user could use the app set a rule to over-ride the pre-programmed notification rule and instead also generate a notification of the trigger event to the monitoring station 222 if, for example, the same trigger event is detected a set number of times (e.g., 3 times) within a given time period (e.g., 5 minutes). Other exemplary rules could be based on the time of day (e.g., over-ride the default rule everyday between 8 pm and 10 pm) or set periods of time on a one-time basis (e.g., between Monday and Friday for one week when the user is on vacation) or categories of trigger events (e.g., trigger events that indicate intrusion, panic, fire, medical environmental for example). This automatic over-ride provides the user with enhanced security in the event the user is not in a position to timely receive and/or self-monitor the call phone device for trigger event notifications. The automatic override rule could be maintained at a cloud-based server to ensure that the automatic rule would be applied even if the portable electronic device on which the app is used was not in communication with the server at the time of the trigger event.

Method of Charging for Monitored Events

Conventionally, customers are charged a monthly fee for monitoring services by the monitoring station 222. The monthly fee is a deterrent for some users to receive monitoring services. The inventors have determined a method of more efficiently charging for monitoring services that is different from the conventional monthly monitoring billing. In particular, a user is charged for each event that is reported to the monitoring station on an event-by-event basis, as opposed to a flat monthly fee. In essence the charges are a la carte. This provides the user with ultimate flexibility to choose which types of trigger events should be reported to the monitoring station, which would commonly be those that the user considers to be the most serious. A counter is used to track the number of triggered events that are reported to the monitoring station 222 within a given time period (e.g., a month). The counter may be implemented at the cloud-based server or at the monitoring station 222, both of which having information sufficient to count reported trigger events resulting from the pre-programmed rules and those resulting from over-rides, either manual or automatic. Alternatively, the base unit 10 may be configured with a memory that stores the counter, in which case the cloud-based server would need to communicate to the base unit 10 the number of reported trigger events originating from over-rides of the pre-programmed rules. The method may include a billing option to limit the number of trigger events for which a user is charged in a given time period. For example, a user may be charged for the first three reported trigger events in a given month, but not for events exceeding three.

Wake Up Base Unit from Stand by Mode

Because portable alarm systems are intended to be powered by battery power when conventional wall-power is not available, power conservation is an important feature of portable alarm systems to improve longevity of the operation of the alarm system on a single charge of the battery.

To conserve power stored in the battery in the base unit 10, it is known to electrically disconnect the battery from the electrical components in the base unit 10 that draw power, such as by a mechanical switch on the outside of the base unit. This is considered turning the base unit "off" completely. However, in many instances it is preferable not to include a mechanical switch on the outside of the base unit, or, even if included, it is preferable not to turn the base unit completely "off." In those instances, it is known to turn off certain components in the portable alarm system to conserve power, which, in effect, puts the base unit in a "stand by" or "sleep" mode. When the base unit 10 is in a "stand by" or "sleep" mode, there must be a method to "wake up" the base unit. It is known to use the touchscreen on the base unit as a mechanism to "wake up" the base unit. That is, the touchscreen is monitored, and the base unit is configured to "wake up" in response to a human touch on the screen. However, maintaining power to the touchscreen and monitoring the touchscreen require a certain amount of power that can be reduced or eliminated by the inventive method and apparatus described below.

The inventors have developed two alternative methods to "wake up" a base unit from a "stand by" or "sleep" mode. First, a physical SD "key" may be inserted into the SD card slot on the base unit 10 to "wake up" the base unit 10. In particular, the microprocessor 120 is configured to receive a signal from the circuitry in the SD card slot in the base unit 10 indicative of a SD key being inserted. The microprocessor 120 then proceeds to "wake up" the other components of the base unit 10 by electrically connecting the battery to such components.

Figure 4:
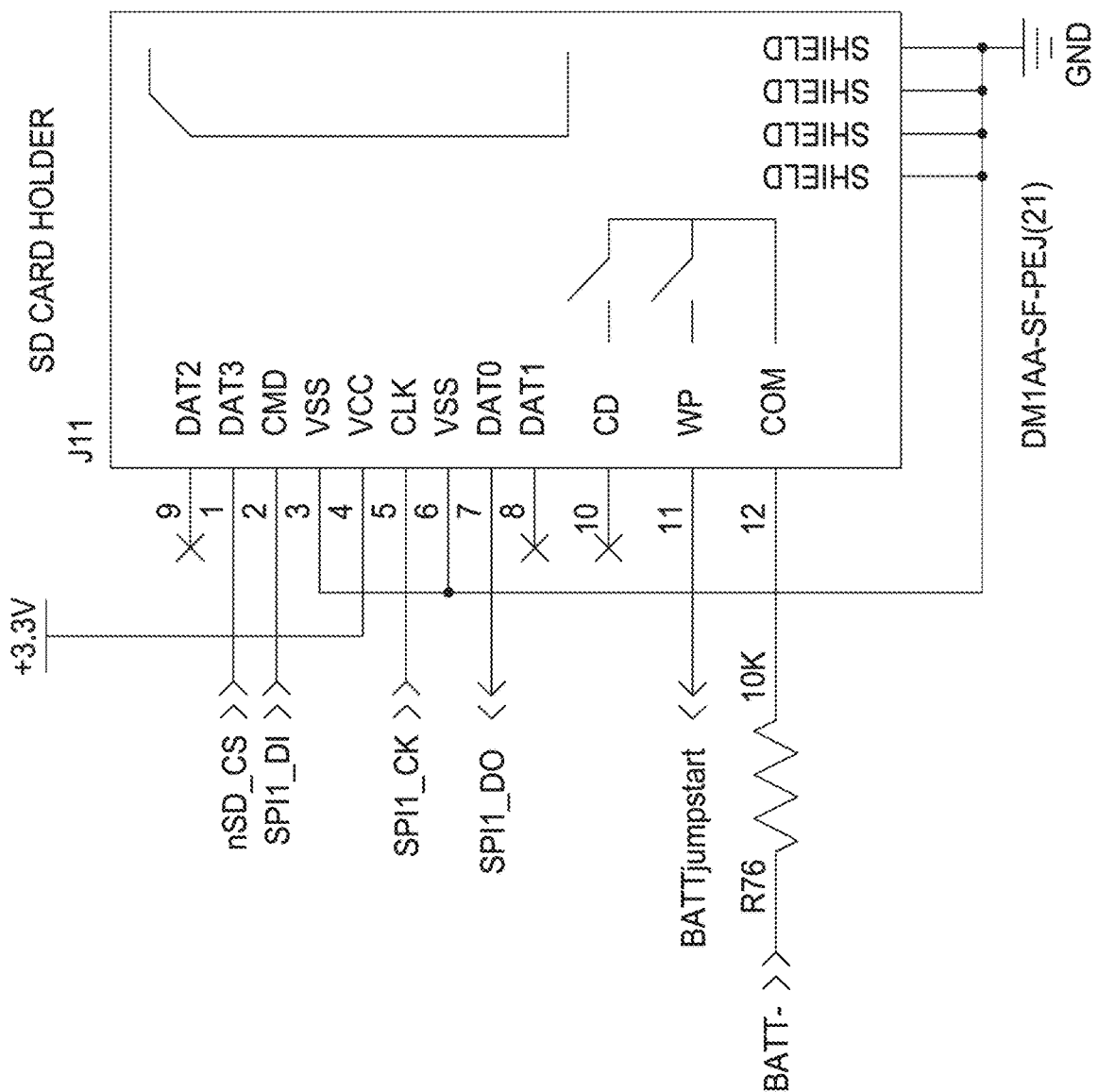
FIG. 4 is a illustration of the pins on an SD Card Holder used in connection with the base unit for waking the base unit up.
Figure 5:
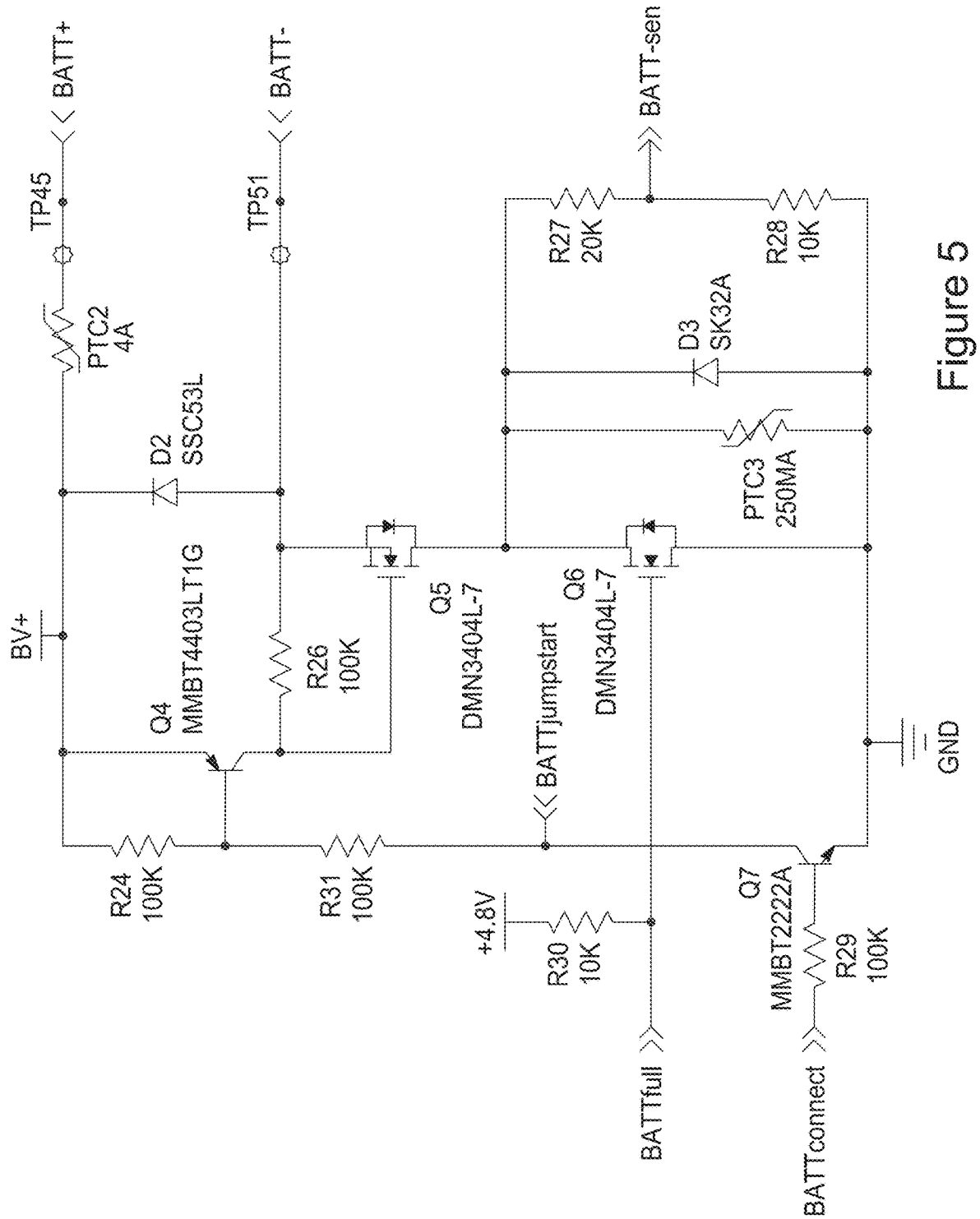
FIG. 5 is a circuit diagram showing the portions of circuitry in the base unit for receiving and responding to the SD Card Holder.

FIGS. 4 and 5 are electrical schematics that illustrate in exemplary configuration for the SD card holder. During Normal Battery Powered Operation (unit is fully operational), the microprocessor holds BATTconnect line high and floats the BATTfull line which allows R30 to pull the line to 4.8V. In this state, the negative side of the battery (BATT−) through the FETs Q5 and Q6 is connected to the system ground (GND). When instructed to Shutdown (by the using input or low battery state), the microprocessor will set the BATTconnect line low which turns off Q7 which turns off Q4 which turns off Q5, disconnecting BATT− from GND. When a SD card (or other plastic key shaped to match a SD card) is inserted into J11, the internal contacts COM and WP will momentarily connected, this connects BATT− to BATTjumpstart. This connection will cause Q4 to turn on which turns on Q5. This action connects BATT− to GND through Q5 and D3. As soon as this circuit is complete, the microprocessor starts and immediately sets BATTconnect and BATTfull to their proper states for Normal Battery Powered Operation.

Alternatively, the base unit 10 may be caused to "wake up" by connecting an external battery to the base unit 10, which is configured to power the internal motion detector 22. Upon receiving power from the external battery, the motion detector 22 detects motion (presumably of the user), which in turn electrically communicates a signal to the microprocessor 120, which in turn causes other components in the base unit 10 to "wake up" by connecting power from the battery to them.

Yet another alternative method of waking up the base unit 10 may be based on a signal generated by accelerometer 106 in the base unit 10. For example, detection by the accelerometer of a particular pattern of movement of the base unit 10 may be used to wake up the base unit 10. An exemplary pattern of movement that may be used to wake up the base unit could include the combination of picking the base unit up from a resting position and then rolling the base unit over. Such a combination of movements would be relatively rare in common use or transportation, and could therefore serve as a unique detectable movement to "wake up" the base unit 10.

Solar Panels

The base unit 10 may further include one or more solar panels integrated into or attached to the exterior of the housing 11. The solar panels may be configured to receive sunlight and convert the sunlight to electrical charging power in a conventional manner. The solar panels are connected to the battery 28 to charge the battery 28. Alternatively, battery 28 may instead be replaced by a super capacitor to store energy to power the base unit 10. The combination of the solar panels and the battery or super capacitor may greatly extend the time period that the base unit 10 may operate without wall power and/or eliminate the need for wall power altogether.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A portable alarm system, comprising:
   a portable base unit having a microprocessor and a wireless transceiver in electrical communication with the microprocessor, the microprocessor being configured to receive a signal indicative of a trigger event detected by a sensor, and the transceiver being configured to communicate over wireless networks;
   wherein the microprocessor is further configured to cause the transceiver to communicate trigger events to a cell phone device and to selectively communicate trigger events to a monitoring station based upon the type of trigger event detected by the sensor and in response to pre-programmed rules provided by a user of the portable alarm system; and
   wherein the microprocessor is further configured to receive an override signal from a cell phone device and, in response to receipt of the over-ride signal, prevent communication of a preceding trigger event to the monitoring station notwithstanding a pre-programmed rule that would otherwise cause such trigger event to be communicated to the monitoring station, wherein the over-ride signal is generated by the cell phone device in response to an over-ride rule selectively configured on the cell phone device by a user at a time before the trigger event is communicated from the transceiver to the cell phone device.

2. The portable alarm system of claim 1, wherein the the transceiver communicates at least one of a photograph and a video related to the trigger event detected by the sensor to the cell phone device.

* * * * *